Patented Dec. 15, 1931

1,836,618

UNITED STATES PATENT OFFICE

ERNST POKORNY, OF LEIPZIG, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PROCESS FOR PRODUCING PHOSPHORUS

No Drawing. Application filed May 16, 1928, Serial No. 278,342, and in Germany May 21, 1927.

This invention relates to a process for the production of phosphorus from ferro-phosphorus.

The possibility of producing phosphorus from ferro-phosphorus is of technical importance since in the usual phosphate-reduction processes a portion of the phosphorus is always combined with the iron reduced from the ferruginous phosphate. The ferro-phosphorus thus formed is generally tapped from the furnace together with the slag and forms a by-product of hitherto rather questionable market value. At the same time the ferro-phosphorus absorbs part of the heat supplied in the process and also tends to diminish the yield in elementary phosphorus.

I have now found that it is possible to recover the phosphorus contained in ferro-phosphorus, in the elementary form, and simultaneously convert the ferro-phosphorus into a by-product of generally recognized commercial value, namely, ferro-silicon, by causing ferro-phosphorus to react with silicon.

Investigations have for example shown that it is easy to obtain from ferro-phosphorus, by introducing silicon, a ferro-silicon containing 40–50% silicon and less than 0.5% phosphorus.

Advantageously however, the production of the usual commercial products containing 50, 75 or 90% silicon, should be aimed at from the outset.

In carrying out the process of the present invention a mixture of ferro-phosphorus with the requisite amounts of silicon or ferro-silicon having a high percentage of silicon or equivalent amounts of silicon-forming mixtures of for example silicic acid and carbon (e. g. coke) is fused in an electric furnace of known type, which is provided with means for recovering the escaping phosphorus vapours. The removal of the phosphorus vapours from the furnace chamber may if desired be facilitated by the introduction of inert gases. The ferro-silicon produced is tapped off at intervals or continuously.

Examples (1) 1000 kgs. ferro-phosphorus containing 14% P and 9% Si broken to pieces having about a weight of a dekagram each are mixed with 800 kgs. of a similarly sized ferro-silicon containing 90% Si and introduced into a closed electric furnace, provided with means for introducing nitrogen from a gas-holder and having an exit tube connected with a condensing plane for the escaping vapours of phosphorus. The mixture is melted down while a current of nitrogen is passed through the furnace and finally the resulting melted ferrosilicon, having 45% Si and phosphorus not exceeding 0.4% P is tapped off.

(2) 1000 kgs. ferrophosphorus containing 14% P and 9% Si broken to pieces having about a weight of a dekagram each are mixed with 3000 kgs. of a similarly sized ferrosilicon containing 90% Si and introduced into a closed electric furnace, provided with means for introducing carbon monoxid from a gas-holder and having an exit tube connected with a condensing plant for the escaping vapours of phosphorus. The mixture is melted down while a current of carbon monoxid is passed through the furnace and finally the resulting melted ferrosilicon, having 70% Si and phosphorus not exceeding 0.1% P is tapped off.

(3) In a closed electric arc furnace a charge consisting of a mixture of ferrophosphorus, containing 18% P and 6% Si, with 4,8 times its weight of broken quartz (98 to 99% $SiO_2$) and 2,4 times its weight of coke (with about 10% ashes), is melted down. The vapours of phosphorus and carbon monoxid generated during the melting process are allowed to escape to a condensing plant for the phosphorus. The silicon produced combines with the iron present to form ferrosilicon of about 70% Si-content, while the phosphorus is expelled from the ferrophosphorus nearly quantitatively, the ferrosilicon retaining only traces of phosphorus.

I claim:

1. The process which comprises melting down ferro-phosphorus in the presence of material yielding silicon at the melting temperature of ferro-phosphorus, thus replacing the phosphorus in ferro-phosphorus by silicon, and recovering the volatilized phosphorus.

2. The process which comprises melting down ferro-phosphorus with ferro-silicon having a high content of silicon, thus replacing the phosphorus in ferro-phosphorus by silicon, and recovering the volatilized phosphorus.

3. The process which comprises melting down ferro-phosphorus with ferro-silicon having a high content of silicon, the respective quantities of ferro-phosphorus and ferro-silicon in the mixture being calculated with respect to their silicon contents so as to produce a ferro-silicon of commercial standard, and recovering the volatilized phosphorus.

4. The process which comprises melting down ferro-phosphorus and a mixture of quartz and coke yielding silicon in the quantity required to replace the phosphorus and to form a ferro-silicon of commercial standard, and recovering the volatilized phosphorus.

5. The process which comprises melting down ferro-phosphorus with ferro-silicon having a high content of silicon, thus replacing the phosphorus in ferro-phosphorus by silicon, and withdrawing the vapors of phosphorus by passing a current of inert gases through the melting furnace.

6. The process which comprises melting down ferro-phosphorus with ferro-silicon having a high content of silicon, the respective quantities of ferro-phosphorus and ferro-silicon in the mixture being calculated with respect to their silicon contents so as to produce a ferro-silicon of commercial standard, and withdrawing the vapors of phosphorus by passing a current of inert gases through the melting furnace.

7. The process which comprises melting down ferro-phosphorus and a mixture of quartz and coke yielding silicon in the quantity required to replace the phosphorus and to form a ferro-silicon of commercial standard, and withdrawing the vapors of phosphorus by passing a current of inert gases through the melting furnace.

In testimony whereof, I affix my signature.

ERNST POKORNY.